Feb. 11, 1964 W. H. BYLER ETAL 3,121,232
COLOR RADIOGRAPHIC FILM
Filed Dec. 15, 1954 4 Sheets-Sheet 4

FIG. 4

INVENTORS.
WILLIAM H. BYLER
ANDRE K. SCHWERIN
FREDERICK R. HAYS
BY
*Pennie, Edmonds, Morton, Barrows & Taylor.*
ATTORNEYS

United States Patent Office 3,121,232
Patented Feb. 11, 1964

3,121,232
COLOR RADIOGRAPHIC FILM
William H. Byler, Morris Plains, N.J., Andre K. Schwerin, Montreal, Quebec, Canada; Johanna S. Schwerin, Binghamton, N.Y., administratrix of said Andre K. Schwerin, deceased, and Frederick R. Hays, Morris Plains, N.J.; said Byler and said Hays assignors to United States Radium Corporation, New York, N.Y., a corporation of Delaware
Filed Dec. 15, 1954, Ser. No. 475,396
5 Claims. (Cl. 96—68)

This invention relates to photographic film, and especially to a new type of film for color radiography and the like in which differences in hue and saturation are produced as a function of the intensity of light, including X-rays and similar radiations, by which the film is exposed.

It is frequently difficult, and sometimes impossible, to interpret radiographs of the "black and white" type reliably and with a sufficient degree of accuracy. This is due to insufficient contrast, inadvertent variations in techniques, materials and conditions, to various overlying layers of material such as tissue which, as a group, may intercept X-rays, and to variations, or to certain foreign bodies, in tissue or bone which yield little or no discernible differences in a gray-scale radiograph.

In view of these and other recognized limitations, it has heretofore been proposed to make radiographs on "color film" of various types well known in the art of color photography, in an effort to obtain a radiograph in which differences in structure or differences in condition of the subject would be represented in the radiograph by differences in color as well as by differences in neutral density. However, the results have been unsuccessful because of failure on the part of the workers to understand the principles involved and to employ film of a type based on those principles and thus suited to the purpose.

We have discovered that the film should respond to modulation or variations in intensity of the particular light or radiations by which it is exposed, and may be sensitive to a minimum degree to variations in "hardness" of the radiations. Also, the film must yield a good scale or range of colors over a normal range of exposure to light and various invisible radiations without sacrifice of visual (neutral) density, and with least possible sacrifice of speed, compared with that of normal "black and white" radiographic film. After development it should yield a good color scale, viz., wide range of hues at substantial saturation and a large number of minimum perceptible color differences (MPCD), in response solely to intensity modulation of such light.

The earlier failures in colored radiography are not surprising when it is realized that the object of color photography is to reproduce on film or print, the colors in respect to hue, saturation, and brightness, of the subjects photographed, whereas the object of the present invention is to employ different colors to make perceptible (especially in a radiograph) all, or selected, differences in structure and condition of the subjects regardless of their color, and indeed of subjects which may even be of the same color.

A more general object is to provide an improved technique and means for indicating, recording or measuring differences in intensity of light.

Objects of this invention can, to a useful extent be achieved by the means and method disclosed in copending application Ser. No. 406,546, filed January 27, 1954 (now U.S. Patent 2,807,725, granted September 24, 1957), by Andre K. Schwerin, one of the joint applicants herein, if features of the prior application be combined with those herein described. Hence, the subject matter of the prior application is by reference incorporated in this application which is a continuation-in-part of the prior application. For example, good color radiographs can be produced by use of special intensifying screens (later referred to) which emit suitable proportions of light in selected regions of the spectrum in combination with special film of the general type herein disclosed but wherein the different color-producing emulsions are sensitized to respond to different colors. This type of combination has the special feature of allowing the user extra control over performance of the film by selection of intensifying screens emitting different colors.

In "black and white" radiography all of the information is contained in the gradations of neutral, viz., gray-scale, density. As above indicated, the principal object of our invention is to retain as much visual density information as a black and white radiographic film shows and to add to that information as much color information as possible. Therefore, the expression "normal black-and-white radiographic film" as employed in the claims means the particular black-and-white film for which is substituted the color film according to this invention. As in black and white photography, it is necessary that a compromise be effected in connection with the visual density characteristic because high contrast and wide exposure latitude are incompatible. This results from the fact that high contrast, viz., high gamma, means a rapid increase of density and, above a certain density level it is difficult visually to detect density differences in the gray scale. Since this limitation does not exist in the case of color contrast we are able to take advantage of the fact and introduce information by color contrast which is of great additional value. It is desirable, therefore, that the film of our invention should be arranged to yield the best or most effective combination of visual density and color information.

Color information can be shown, as it is in connection with the present disclosure, in terms of chromaticity by plotting the color points on CIE chromaticity diagram in well known manner. From the chromaticity curve a curve of summation of minimum perceptible color differences against exposure can be drawn, in order to show the color information in terms of color contrast. Since we have found that at times color contrast curves are irregular (from which it follows that a single value for slope, viz., contrast, does not exist) it is frequently necessary to describe color contrast in terms of curves.

The film constituting the present invention comprises a new article of manufacture which has radically different characteristics from the various forms of "color film," both of negative and positive type, heretofore known. Although there are many differences in characteristics between prior film and that of our invention, the ones appearing most apparent are as follows: In "color film" several layers are sensitized to light of different colors substantially equally with equal exposure, to reproduce (after development) with greatest possible fidelity not only colors but also the gray tones of the objects or scene. With the usual type color film, change of exposure merely produces change in density of colors already produced. On the other hand, the film of our invention yields a change in color as well as density in response to change in exposure. Briefly, we achieve the desired color differences by selecting the emulsion characteristics so that different dyes are introduced at different rates as exposure is increased resulting in large changes in overall color.

The film according to our invention is made up of one or more emulsions which may be sensitive to light of one and the same color only (blue, for example) and having the further characteristic that after development they produce not only different colors but also different densities in response to a given exposure. When two or more emulsion layers are employed, we prefer to select the colors so that the color distance between successively appearing colors of any combination does not include more than one primary. In this manner gray-tone or highly unsaturated colors in the color scale produced by the use of known color film, especially in the case of two-dye film, can be avoided.

The film of our invention is independent of the dye system, viz., it may employ primaries or complementaries. Also, it is independent of the physical arrangement of the color-forming elements, permitting the color-producing emulsions to be mixed together or to be formed in discrete layers. This permits use of reversal or non-reversal film, and also permits wide latitude in processing or developing techniques.

Further advantages resulting from this invention are that: the film may be designed to have adequate speed and an adequate range of visual density contrast involving latitude; the principal range of the visual density curve approaches a straight-line; it is capable of a large range of hues with sufficient saturation and color contrast in terms especially of the MPCD-vs-exposure curve; the film can be developed under a safe-light as usually used for black and white radiography but not for "color film"; its orientation in an X-ray cassette is not significant; and it can be made and developed at lower cost than the usual commercial "color film."

A better understanding of the invention will be had from the following description considered in connection with the drawings in which.

Some of the terms employed herein may be defined as follows:

*Color* is the evaluation of the physical stimulus in terms of a standard observer capable of reaction through vision to hue, saturation and brightness.

*Speed (S):*

$$S = \frac{K}{E}$$

at density 0.5 above fog, where $E$ is exposure and $K$ is a constant.

*Speed Spread ($\Delta s$):*

$$(\Delta s\%) = \frac{100\gamma(\Delta \log E)}{D_s (\max.)}$$

where $\gamma$ is contrast, $D_s$ is spectral density, $\gamma$ and $D_s(\max)$ apply to the faster emulsion, and $\Delta \log E$ applies to the exposure spread between the second fastest and the fastest, or the slowest emulsion. Thus, a 100% speed spread represents the case where the maximum density of the faster emulsion is reached at the degree of exposure where the density curve of the slower emulsion begins. We prefer to restrict the speed spread to between 5% and 100%.

*Visual Density (D):*

$$D = -\log \frac{Y}{Y_0}$$

where $Y$ is transmitted light or brighness of the source viewed through the film, $Y_0$ is incident light or brightness of the source, and $Y/Y_0$ is luminous transmittance.

*Spectral Density ($D_s$):* $D_s$=log of the reciprocal of the transmittance to monochromatic light at the peak of the absorption curve of the dye being measured.

*Maximum Spectral Density ($D_s max$):* $D_s$(max=peak spectral density of the characteristic curve (the plot of $D$ vs. log $E$). We prefer that the maximum spectral density of the fastest emulsion be not above 90% of that of the second fastest emulsion.

*Contrast (gamma):*

$$\gamma = \frac{D}{\log E}$$

viz., the maximum slope of the characteristic curve.

*Visual Density Contrast,*

$$\frac{D_v}{\log E}$$

is the maximum slope of the visual density curve.

*Spectral Density Contrast,*

$$\frac{D_s}{\log E}$$

is the maximum slope of the spectral density curve.

*Exposure Latitude*=$\Delta \log E$ for a given density range. In connection with radiography this range is usually taken as between 0.3 and 1.5 above fog; although for other photographic applications it may extend to 3 or 4.

*Minimum Perceptible Color Difference (MPCD)* is as determined by D. L. MacAdam, see Journal Optical Society of America, vol. 32, page 247, et seq. (1942).

Those familiar with the art of color photography are aware of the fact that in the usual "color films" every effort is made to produce curves for the several emulsion layers of identical shape and equal effective speeds. However, the actual emulsion speeds are adjusted to compensate for non-uniformity in the spectral emission of the illuminant by which the film is to be exposed. The differences between the well-known "daylight" film and "tungsten" film are an example of such adjustment. Also, the actual emulsion speeds of such color film are adjusted to compensate in an under layer for certain light absorption in the covering layer or layers. It should also be kept in mind that because of the fact that substantially all photographic emulsions are sensitive to blue light, as well as to the color for which they are specifically sensitized, the layers must be placed properly in relation to a yellow filter layer which is commonly placed between the yellow- and magenta-producing layers and which inhibits exposure of the green-sensitive and red-sensitive layers by blue light. Since these factors are of no importance in connection with the present invention the usual yellow filter layer is omitted from our film and the usual non-halation layer is also omitted. The same dyes can be used in the film of this invention as have heretofore been employed in ordinary color film, for example, yellow magenta and cyan, and hence descriptions of the chemical nature of these dyes or dye-couplers need not be given. Additionally, colored dye couplers can sometimes be used to extend the color ranges as referred to below.

Figure 1:
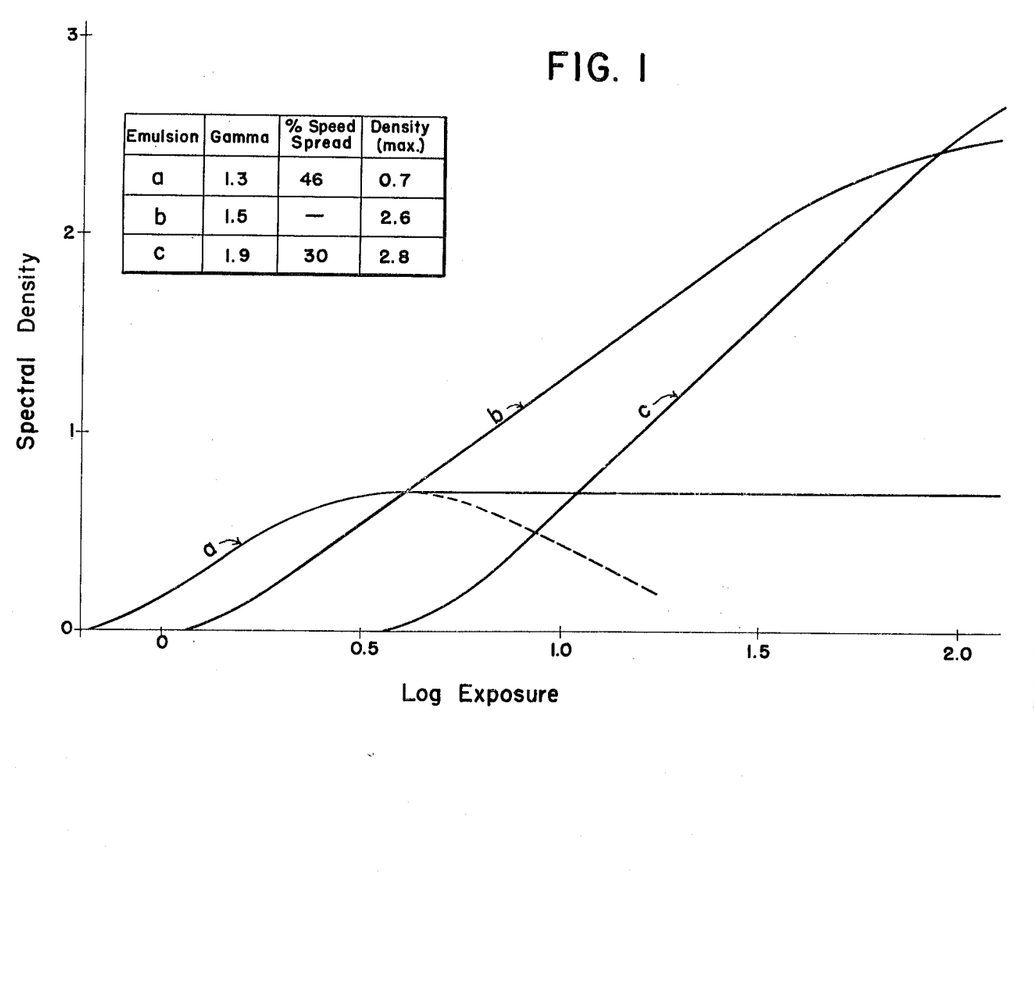
FIG. 1 displays basic characteristic curves showing density change with (log.) exposure of a three-emulsion film. The dotted line shows the effect of solarization in one emulsion. The emulsions may or may not be in separate layers.

In view of the foregoing résumé of the characteristics typical of a so-called "color film," reference to FIG. 1 will disclose fundamental differences in characteristics employed in the film of the present invention. This graph represents the characteristic curves of three-emulsion, three-color film especially adapted to the purposes of this invention. Such emulsions may be applied, respectively, on the film base in discrete layers, or two or even three of them may be physically mixed and applied, as one or two layers in so-called mixed grain emulsions. Since it is intended that the film be viewed or ultimately used in connection with transmitted light so as to produce overall film colors, the physical disposition of the several emulsions is of little importance. By "overall" color is meant the color effect resulting from viewing the film by transmitted light from a given illuminant. For example, if white light passes through superposed dyes of two primary colors, the "overall" color will be different from either of them. However, the disposition of the emulsions may be related to the method or procedure of development which must be chosen accordingly, as is well known in the art of color photography.

Because of the fact that the characteristic curves of FIG. 1 are in the nature of basic graphs the colors are designated only by the letters $a$, $b$, $c$, in order to make them universally applicable. For example, by changing or by omitting dyes in the emulsions, or by doing both, the gamuts of color represented in FIGS. 2 and 4 can be obtained.

The numerical descriptions of the characteristic curves of FIG. 1 are give in the table on the same sheet wherein it is shown that emulsion $a$ has a gamma (contrast) of 1.3, a speed spread of 46% from the emulsion of curve $b$, and a maximum density of 0.7. In order that the desired color spread be obtained, it is preferable in accordance with the invention that the second fastest emulsion be assumed as the base or standard with which the speeds of the other emulsions are compared. It will be observed from the curves that the emulsion $b$ here represents such standard emulsion layer and that emulsion layer $a$ is of a higher speed and emulsion layer $c$ is of a lower speed. On this basis, as shown in the table of FIG. 1, emulsion $a$ is 46% removed or "spread" from $b$ and emulsion $c$ is 30% removed or "spread" from $b$.

These values are derived as follows: As above indicated, speed spread comprises the relationship of emulsions taken two at a time, and the spread or difference between emulsion $b$ and emulsion $a$ as a reference, is taken from the curves in FIG. 1. It will there be noted that emulsion $b$ is slower than emulsion $a$ and that its density curve commences on the abscissa representing Log Exposure at a point where the density of emulsion $a$ has reached an appreciable value. The distance along the abscissa from 0 to 1.0 is the unit of measure. Hence, based on this unit, it is seen that the distance between the intersection of curve $a$ with the base line and the intersection of curve $b$ with the base line is approximately ¼ unit even though the first mentioned intersection happens to be to the left of zero. Hence, the exposure spread, $\Delta \text{Log } E$, expressed numerically is 0.25. Correspondingly, the distance along the abscissa or base line between the intersection of curve $b$ and curve $c$ is approximately 0.52 with respect to the same unit distance. Therefore, the exposure spread, $\Delta \text{Log } E$, expressed numerically is 0.52. In the table, FIG. 1, gamma for emulsion A is 1.3 and maximum density is 0.7.

If these values are substituted in the previously given equation for speed spread, a value of 46% for speed spread is obtained. The figures in the right-hand column of the table representing maximum density are of course in respect to spectral density, since this is the specific density represented in the curves of FIG. 1. It should also be noted that the only actual value for maximum density which can be read from the curves of FIG. 1, is that of emulsion $a$. The maximum densities of emulsions $b$ and $c$ are beyond the curves shown in the figure; but these values are stated in the table.

The speed spread of 30% represented in the table of FIG. 1 as between emulsion $c$ and emulsion $b$, is similarly obtained from the mentioned equation by using the value 1.5 for a gamma of emulsion $b$, 2.6 for maximum spectral density of emulsion $b$, and 0.52 for $\Delta \text{Log } E$. As before, the value for $\Delta \text{Log } E$, is obtained from FIG. 1 as the ratio of the distance between the intersections of curves $b$ and $c$ with the base line to the distance between 0 and 1.0. Here the values for gamma and maximum density for emulsion $b$ are used instead of those of emulsion $c$ because, in accordance with the invention, the spread in each case is compared against the faster emulsion.

From the foregoing it will be understood that to obtain the widest possible color scale for a given exposure (which is one of the principal objects of the invention) the speeds of the respective emulsions should be chosen such that the maximum density of one emulsion will not be reached until after the other emulsion with which it is being compared (viz. from which it is spread) has commenced its density change. That the foregoing is true of the emulsions represented in FIG. 1 is evident from the fact that emulsion $a$ reaches its maximum to the right of the commencement of curve $b$, and emulsion $b$ reaches its maximum to the right of commencement of curve $c$. This explains why a value for maximum density appears in the equation for speed spread.

Figure 2:
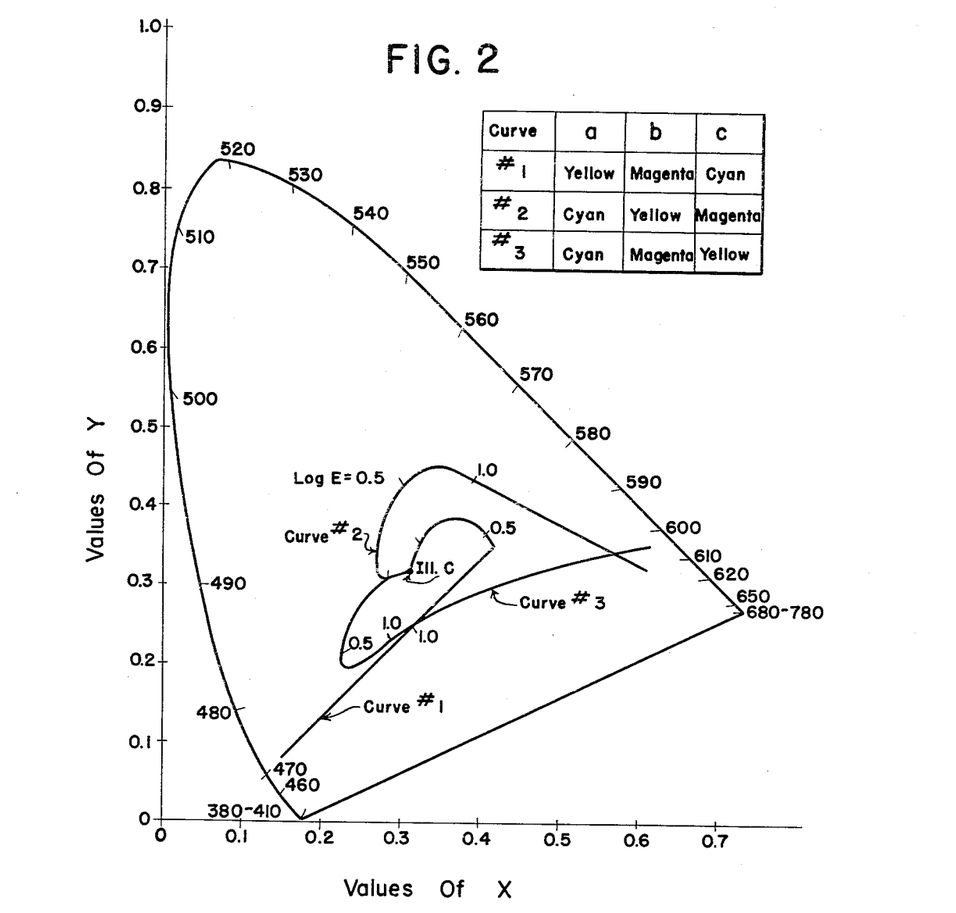
FIG. 2 is a CIE chromaticity diagram showing three curves of three-emulsion films developed as to dyes in the different emulsions as represented in FIG. 1.
Figure 4:
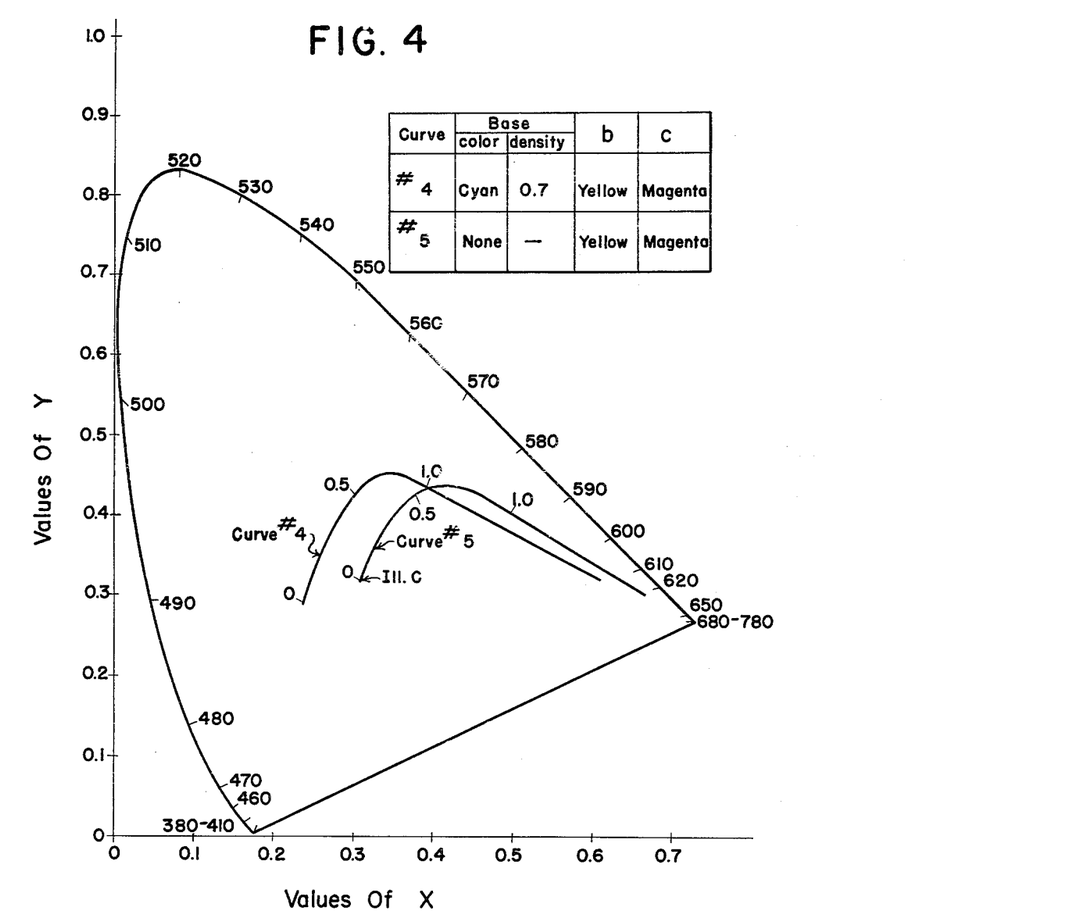
FIG. 4 is a chromaticity diagram of the nature of FIG. 2, but applied to a two-emulsion film, therefore being based upon curves $b$ and $c$ of FIG. 1.

CIE chromaticity diagrams of the nature of those comprising FIGS. 2 and 4 are now commonly employed in the art because they present information which is difficult to express in words or in other types of graphs. They are based on a series of international agreements effected through the International Commission of Illuminants.

Referring to FIG. 2, the solid curve is the locus of visible spectral radiation. The abscissae represent the fractional amount of the X primary and the ordinates represent the fractional amount of the Y primary in the stimulus. "Ill. C." is the illuminant, here represented as white light. Curve 1, curve 2 and curve 3 show the color gamut of three different films numbered, respectively 1, 2, 3 in the table of FIG. 2. Each of these films comprises three emulsions having the respective characteristics illustrated in FIG. 1. The differences in the color gamuts produced by the different examples result from the fact that the emulsions $a$, $b$ and $c$ carry different dyes in the three examples, as shown in the table. Thus it will be seen that if the emulsions $a$, $b$ and $c$ having the density characteristics and speed spread of FIG. 1 carry color-producing dyes of yellow, magenta and cyan, respectively, a chromaticity curve as represented by curve 1 of FIG. 2 will result when the film is viewed by white light. In brief, this means that over the spectral density range illustrated in FIG. 1 variations merely in intensity of the light, or radiations, by which the film is exposed will produce color changes running from greenish yellow through yellowish orange, pink, magenta and purple to purplish blue. On the other hand, merely by interchanging the dye-couplers in the $a$, $b$ and $c$ emulsions so that they produce cyan, yellow and magenta, respectively, curve 2 is obtained which, as represented in FIG. 2, runs from greenish blue, through green, yellow and orange into reddish orange. The dye coupler arrangement indicated for curve 3 produces a color gamut starting at greenish blue and running through blue, purple, magenta and red into deep orange.

In connection with radiography, the significance of the first-mentioned of the above color gamuts would be as follows: Assuming that the radiograph is of a portion of the human body which includes a metallic foreign body, tissues of varying thickness and bones, a film as represented in curve 1 of FIG. 2 will exhibit the following colors: The foreign body will be represented as a light pale yellow, the bones as yellow to orange, depending on their density, and the tissues as orange-red, to red, to magenta in order of decreasing absorption, while the background appears as deep blue. A radiograph made on standard black and white film under the same conditions would show a substantially transparent area for the foreign body, and the bones and tissues which vary in absorption, as is well known, would appear in various shades of gray, there being little difference between thin bones and thick tissues, for example, between different tissues of slightly varying thickness and often between normal and abnormal tissue of the same thickness. On the other hand, since the mentioned physical differences produce discernible color differences in the film of the present invention, these differences can readily be distinguished and, if experimentally standardized, the nature of the differences can be ascertained for diagnosis.

By viewing a white light through a film comprising three color dyes, such as yellow, magenta and cyan, as above described, it is possible to produce a large color range, so there appears to be little, if any, reason for employing emulsions producing more than the three primary colors, additive or subtractive. If the occasion requires, however, this can be done by following the principles herein set forth. But there are advantages in employing less than three color-producing emulsions, two-color and even one-color emulsions having valuable applications which will hereinafter be discussed.

Figures 3, 5, 6:
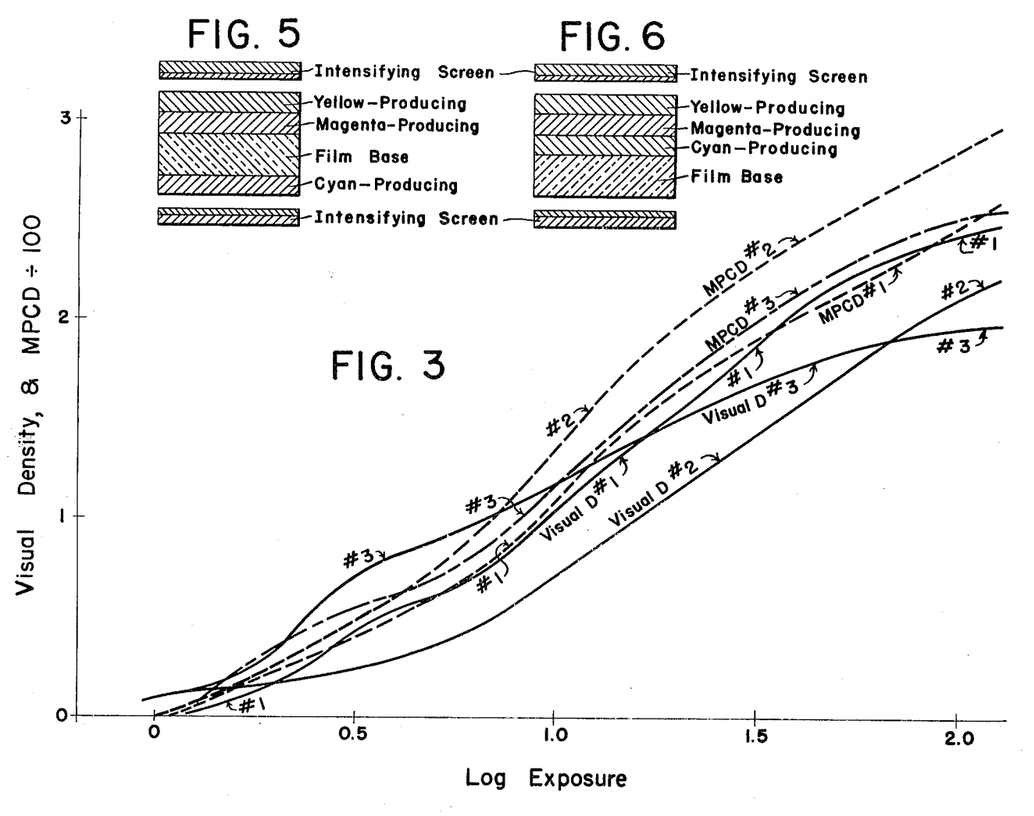
FIG. 3 Illustrates in the solid lines the relation of exposure to visual density, viz., neutral or "color blind" density plotted from the curves of FIG. 1; whereas the dotted lines represent the relation between exposure and minimum perceptible color difference (MPCD), divided by 100 for convenience, of the chromaticity curves of FIG. 2.
FIG. 5 is a view in cross-section of a preferred embodiment of film according to the invention, one emulsion layer (cyan) being coated on the "back" of the film base. The illustrated intensifying screens are optional, but usually preferred in radiography.
FIG. 6 is a view in cross-section of an alternative embodiment in which all of the emulsion layers are on the same side of the film base. Assuming that any layers may be omitted as desired, FIG. 6, as well as FIG. 5, may be understood also to illustrate two-layer and single-layer films.

The significance and uses of the curves of FIG. 3 are best described in relation to the two preceding figures. Given the characteristic spectral density vs. exposure curves of FIG. 1, the curves of FIG. 2 and FIG. 3 depend upon three variables: (a) the disposition of the chosen dyes among the characteristic curves; (b) the spectral absorption curves of these dyes; and (c) the spectral emission curve of the illuminant. Spectral absorption curves of such dyes are well known, and illuminant emission curves are readily obtained. Spectral density (see FIG. 1) expresses the density in terms of absorption only at the peak of a given dye absorption curve. Knowing this value for a given exposure and knowing the spectral absorption curve, its effect in absorbing light from the film illuminant at various wavelengths can be determined.

The above information is used in two ways: (a) It is integrated with the tristimulus (three-color visibility) curves to yield quantitative information on film color, i.e., tristimulus values (X, Y, Z); and (b) since one of these three values (the Y tristimulus value) represents brightness as such (independent of color), from this value visual density can be determined. Of course, at exposures where the three dyes all contribute, the calculated tristimulus values result from spectrally summing the effects of the three. This is evident from the fact that in viewing a white light through a film containing emulsions producing the three primary colors, any or all of the spectral colors may be seen depending upon the densities of the primaries. Essentially, the calculation comprises integrating three sets of curves: the emission curve of the viewing light source, the absorption curve or curves of the dye or dyes, and the visibility curves of the eye. In connection with FIGS. 2 and 3, the light source "Illuminant C" is taken as a standard source of white light, and thus all of the clear-base films have "Ill. C." as the point of origin of their chromaticity curves, as in FIG. 2. The CIE chart of FIG. 2 is simply related to tristimulus values as follows: The abscissa values are $$x = \frac{X}{X+Y+Z}$$

and the ordinate values are $$y = \frac{Y}{X+Y+Z}$$

Since by definition $x+y+z=1$, a two-dimensional representation is a complete representation of color, except for brightness which is represented by Y.

The MPCD (dashed) curves of FIG. 3 are derived from the corresponding chromaticity curves of FIG. 2 by relating the positions and lengths of the curves to known values of color difference sensitivity of the eye in different parts of the CIE diagram. These MPCD curves represent summations of color difference perceptibilities along the chromaticity curves. Since color difference sensitivity varies in different regions of color, it is advantageous to design the film so that the chromaticity curve lies in regions where this sensitivity is high. Such design includes the shapes and relative positions of characteristic curves, the choice of dyes and the disposition of dyes among the characteristic curves. The information displayed by the film between visual densities of 0.3 and 1.5 is the most important because the eye loses ability to see differences well on either end of this range; so, taking this density level for a given film, the exposures required to produce them are seen in FIG. 3. The color information displayed between these exposure limits can then be chosen from the corresponding MPCD and chromaticity curves. In the case of MPCD, high slope, wide range and smooth shape are desirable. Curve #2 is the best of the three in this respect. The visual density (solid) curve #2 shows that it is the slowest film of the three, which illustrates the fact that we are dealing with a compromise situation. In the case of chromaticity (FIGS. 2 and 4), a good distance from the origin (which represents a favorable degree of saturation) and a large range of hues without repetition are desirable.

It should be kept in mind that the MPCD curve alone is not a sufficient criterion of color quality of the film. A relatively straight chromaticity curve could generate a good MPCD curve but show little or no hue change.

There is no satisfactory means for depicting hue change except by the chromaticity curve itself. A straight line drawn from the origin (Ill. C., FIG. 2) through the color point in question and extending to the periphery of the color domain shows a dominant wavelength of that color at the intersection of the line with the periphery (purples being expressed in terms of their complementary green), where an extension of the straight line in the opposite direction intersects the periphery in the green region; thus, e.g., 520-C represents a purple. It is thus seen that all of the curves of FIG. 3 have a wide hue range.

Since in photographic color film, which must reproduce a gray scale, the net speed spread must be zero, any speed spread at all will cause development of a color scale instead of the gray scale. We choose 5% as our lower limit of speed spread because we discovered that, in conjunction with the other essential characteristics herein specified, this represents a minimum spread in terms of color differences in the developed film which are useful for the purpose. As speed spread is increased further, the developed color scale becomes still more useful. However, referring to FIG. 3, we have to be concerned also with shapes of the MPCD and visual density curves. The visual density curve #2 shows that it is possible to choose emulsion characteristics so that this curve is free of inflections. But, if the speed spread were allowed to go above approximately 100% an inflection could not be avoided since this would allow an exposure range over which the density contributed by the faster emulsion would not be changing and the slower emulsion would not have started its contribution.

The film according to this invention is simpler in construction than ordinary color film since it contains no filter layer and no anti-halation layer. In addition, film further simplified in construction as herein described, can be designed to impart considerable information through color differences. Film which comprises less than three color-producing emulsions can, in accordance with the invention, be made to provide results approximately equivalent to three-emulsion films if the clear or colorless film base, which has been assumed in the previous descriptions, is replaced by a film base tinted with a color properly selected in view of the colors produced by the emulsions. Also, in special cases a tinted base is useful in a film having three color-producing emulsions. In this connection it should be understood that a tinted film base is, in connection with the present invention equivalent to using a film having a clear base and viewing the film with light similarly tinted. It is therefore to be understood that throughout the present specification and claims, reference to a film base of a certain color is intended to cover the equivalent use of light similarly colored to view an otherwise similar film having a clear base.

In the case of film having emulsions producing two colors, the effect of the omitted emulsion can, as above stated, be fairly closely approximated by employing a film base tinted with the omitted color. Referring to FIG. 1 in this connection, if emulsion $a$ were replaced by a tinted film base, the density curve represented by curve $a$ would be a horizontal line, since the density would not change with exposure. Suitable combinations of color-producing emulsions and film bases for two-emulsion films having advantages of this invention are as follows:

| Film Base | Faster Emulsion | Slower Emulsion |
|---|---|---|
| Clear | Yellow | Magenta. |
| Cyan | do | Do. |
| Green | do | Do. |
| Clear | Magenta | Yellow. |
| Cyan | do | Do. |
| Blue | do | Do. |
| Clear | do | Cyan. |
| Yellow | do | Do. |
| Red | do | Do. |
| Clear | Cyan | Magenta. |
| Yellow | do | Do. |
| Green | do | Do. |
| Clear | Red | Blue. |
| Yellow | do | Do. |
| Green | do | Do. |
| Clear | Blue | Red. |
| Cyan | do | Do. |
| Green | do | Do. |

The colors above listed are the additive primaries blue, green and red and the subtractive primaries cyan, yellow and magenta, respectively. Colors are so chosen that the color distance between successively appearing colors of any combination does not include more than one primary, because this avoids gray-tone or highly unsaturated colors in the produced color scale, this being a definite departure from prior practice involving two-emulsion color film.

The chromaticity diagram of FIG. 4 shows two curves #4 and #5 which illustrate examples of two-emulsion film with and without a tinted base, respectively. Curve #4 shows the color gamut of a two-emulsion film in which the emulsions $b$ and $c$ produce yellow and magenta, respectively, and the base is tinted cyan, viz., blue-green. The two emulsions $b$ and $c$ have the density characteristics and relative speeds shown for the corresponding curves in FIG. 1. Since the light by which the film is viewed is here colored cyan, the curve does not start at "Ill. C." which represents white light, but to the left in the cyan region, because at this point no exposure has yet occurred. The density of the cyan base is assumed fixed at the value of 0.7. As the exposure proceeds, the curve passes through green, yellow, orange, orange-pink to reddish-orange and almost into the red region, which is very similar to the color gamut shown in curve #1 of FIG. 2 of a three-emulsion film.

Curve #5 is also based upon a yellow emulsion $b$ and a magenta emulsion $c$ but with a clear film base. Thus the curve starts at "Ill. C." and runs through greenish yellow, yellowish orange, reddish orange and into the red region, showing slightly more saturation than curve #4. From this curve it is evident that film which carries a two color-producing emulsion and without a tinted base or a tinted viewing light can, if proportioned in accordance with the invention, produce a large and useful color gamut.

A film having an emulsion producing a single color, is, as above indicated, also useful if employed in accordance with the invention. For example, if a magenta-producing emulsion is combined with a yellow-tinted film base (or is viewed with a yellow light), a considerable range of colors will appear as the result of density variation due to exposure. A film of this type provides much more information in dental work, for example, than a black and white film can provide, and at very little more cost. The following color combinations of base and emulsion have been found to be of particular value in connection with single-emulsion film of the present invention:

| Base Color | Emulsion Color Produced |
|---|---|
| Clear | Magenta. |
| Blue | Do. |
| Cyan | Do. |
| Yellow | Do. |
| Clear | Blue. |
| Red | Do. |
| Clear | Red. |
| Yellow | Do. |
| Blue | Do. |
| Green | Do. |

FIGS. 5 and 6 illustrate in cross-section two different film structures carrying three color-producing emulsions, in accordance with the invention. In both cases each emulsion is in a separate layer, all being supported on a film base. Those familiar with the photographic art are aware of the fact that different emulsions can be physically mixed, if desired; so there is no necessary relation between the number of different emulsions and the number of layers constituting the film.

The film structure illustrated in FIG. 5 comprises a film base, on one side of which (the back) is a cyan-producing emulsion layer and on the other side of which (the front) are the magenta-producing and yellow-producing layers, respectively, as indicated. The physical arrangement of emulsion layers in connection with this invention has no significance insofar as color scale is concerned. In cases where the film is used with intensifying screens, the physical arrangement may have a bearing on image definition.

The film structure of FIG. 6 can be assumed to be the same as that of FIG. 5 in all respects except the one which is illustrated, namely, that the cyan-producing layer comprises the first front layer adjacent the film base instead of being located on the back of the base as in FIG. 5. This arrangement is, for many purposes, the equivalent of that of FIG. 5.

On each side of the film in FIGS. 5 and 6 an intensifying screen is represented. Such screens are, in general, well known in radiography; and their design and use in a new combination are described in the mentioned co-pending patent application of Andre K. Schwerin. However, a brief discussion of the use of such screens in connection with this invention will be helpful here.

The intensifying screens as represented in FIGS. 5 and 6 comprise a backing sheet of suitable material, such as cardboard or plastic, coated with a layer of phosphor, or a mixture of phosphors having different response characteristics. To provide a wide range of color, the selection of such phosphors will depend on the characteristics of the film emulsions. If, as is here preferred, the several emulsions are all sensitive to light of one and the same color, this color will usually be within the green to blue range. In this case the phosphor coating on the screen would be selected to have a peak light emission within that range. If, as described in the prior patent application, the emulsions are sensitized for different colors, the phosphors should be selected to produce light of corresponding colors, but modified to product the desired relative speeds. As stated in the mentioned prior application, if the phosphors have a different response to equal intensities of radiation, the quantities of phosphors have to be chosen so that equal radiation intensities produce fluorescent intensities in a predetermined quantitative relation, said quantities being related also to the different sensitivities of the various emulsion layers. In this manner the color scale rendered by a multi-dye, multi-chromatized film can be modified as desired. By thus adjusting the relative amounts of light of different colors by which the film is exposed, it is possible to obtain, in effect, an adjustment of the relative effective speeds of the different color emulsions of the film to degrees approximating those of the film herein described.

In view of the large number of different types of emulsions, manufacturing processes and developing formulae and techniques already known in the color film industry, it is unnecessary to give here the detailed specifications for manufacturing film which will provide the characteristics herein described. Such details, including those relating to solarization, will be found in the literature on the subject, including the following:

Mees: "The Theory of the Photographic Process," MacMillan, 1944 and 1954 Editions
Evans, Hanson & Brewer: "Principles of Color Photography," John Wiley & Sons, Inc., 1953
Evans: "An Introduction to Color," John Wiley & Sons, Inc., 1948
Glafkides: Chimie Photographique, Paul Montel, Paris, 1949
Friedman: "History of Color Photography," the American Photographic Publishing Company, Boston, 1944
Handbuch der Wissenschaftlichen Photographie, vols. IV and VI, Springer Verlag, 1930
U.S. Patent No. 2,005,837—Hans Arens, June 25, 1935
U.S. Patent No. 2,497,917—Robert E. Stauffer, Feb. 21, 1950

By way of example of a preferred embodiment we give the following specifications of a three-emulsion film as illustrated in FIG. 5 and as represented in curve No. 1 of FIG. 2 taken together with the density vs. exposure curves and table of FIG. 1. Assuming that the film is of the negative multi-layer color-producing type, the speeds of the different emulsion layers, as measured in terms of spectral density at the peaks of the respective absorption curves and stated relative to the speed of normal black and white X-ray film taken as 1.0, are approximately as follows:

Yellow-producing layer=0.65 to 0.9;
Magenta-producing layer=0.4;
Cyan-producing layer=0.08 to 0.15.

The ratios of yellow and cyan to magenta speed should be maintained within these ranges if the overall speed is varied.

The contrast (gamma) is as follows (the values being approximate):

Visual density gamma=1.6;
Yellow-producing layer spectral density gamma=1.3;
Magenta-producing layer spectral density gamma=1.5;
Cyan-producing layer spectral density gamma=1.9.

The maximum spectral densities (above fog) are approximately as follows:

Yellow-producing layer=0.7;
Magenta-producing layer=2.6;
Cyan-producing layer=above the magenta value.

All three emulsion layers are sensitive substantially only to blue light.

Colored dye couplers, as previously mentioned, can be employed to extend the color range. By including a colored coupler in the fastest emulsion, the point of origin (referring to the chromaticity diagram) is shifted from the color of the illuminant to the initial color of the coupler, and thus a wider range of hues is introduced.

Another means for extending the hue range is provided by using a suitable degree of solarization in at least one emulsion, preferably the fastest, as shown by the dotted line in FIG. 1. Solarization and its effects are discussed in U.S. Patents Nos. 2,005,837 and 2,497,917, above mentioned.

As previously intimated, film in accordance with the invention has many useful applications outside the medical and dental professions. Three important examples may be given: The film according to the invention may readily be standardized to permit measurement of the intensity of monochromatic light in the photometric field. Additionally, film according to this invention is of value in the color printing industry. In this connection the film is utilized as a masking film (with or without an intermediate negative) in order to overcome by complementary color the frequently encountered overall dominant tint of a transparent document, or the like. By using a standard illuminant and a standardized exposure range, the masking film designed according to this invention may produce any desired neutralization or masking hue which thus is made inherent in the film.

A third application is in nuclear physics, where measurement of energy distribution of nuclear particles may be made in terms of color changes along the tracks.

We claim:
1. A radiographic color film comprising a film base and a plurality of photosensitive emulsions thereon, the speed spread between two emulsions thereof being within the range 5% and 100%, approximately, and the visual density contrast of the film as a whole being at least as high as that of normal black-and-white radiographic film; said film also having at least one of the following two characteristics: (1) the difference in maximum spectral density between the fastest emulsion and the second fastest emulsion is at least 10%, (2) the spectral density contrast of one emulsion differs from that of another emulsion to an extent which produces a useful and measurable color effect; said emulsions being further characterized in that all of the emulsions are sensitive predominantly to light of only one and the same color, and each emulsion contains a dye-forming coupler which differs from the others such that after exposure to said light and subsequent full color development each emulsion absorbs such chromatic light components as to exhibit a mutually different subtractive primary color, whereby said film exhibits different overall film colors of different densities, said last-named film colors being thereby a function of the degree of exposure.

2. A radiographic color film, according to claim 1 in which the fastest emulsion, only, includes a colored coupler.

3. A radiographic color film according to claim 1 in which the fastest emulsion, only, is solarizable within an exposure sufficient to fully expose the other emulsions.

4. A radiographic color film according to claim 1 which comprises two emulsions, and in which said base is of translucent material tinted in a primary color which is different from the primary color exhibited by each of said emulsions, respectively.

5. A color film comprising a film base and a plurality of photosensitive emulsions thereon, the speed spread between two emulsions thereof being within the range 5% and 100%, approximately, and the visual density contrast of the film as a whole being at least 1.6; said film also having at least one of the following two characteristics: (1) the difference in maximum spectral density between the fastest emulsion and the second fastest emulsion is at least 10%, (2) the spectral density contrast of one emulsion differs from that of another emulsion to an extent which produces a useful and measurable color effect; said emulsions being further characterized in that all of the emulsions are sensitive predominantly to light of only one and the same color, and each emulsion contains a dye-forming coupler which differs from the others, such that after exposure to said light and subsequent full color development each emulsion absorbs such chromatic light components as to exhibit a mutually different subtractive primary color, whereby said film exhibits different overall film colors of different densities, said last-named film colors being thereby a function of the degree of exposure.

References Cited in the file of this patent
UNITED STATES PATENTS

| | | |
|---|---|---|
| 549,790 | Hewitt | Nov. 12, 1895 |
| 608,934 | Vaucamps | Aug. 9, 1898 |
| 1,303,635 | Capstaff | May 13, 1919 |
| 2,005,837 | Arens | June 25, 1935 |
| 2,340,656 | Gaspar | Feb. 1, 1944 |
| 2,367,551 | Yule | Jan. 16, 1945 |
| 2,373,732 | Wolfson | Apr. 17, 1945 |
| 2,497,917 | Stauffer | Feb. 21, 1950 |
| 2,509,766 | Gross | May 30, 1950 |
| 2,515,846 | White et al. | July 18, 1950 |
| 2,542,715 | Slifkin | Feb. 20, 1951 |
| 2,644,096 | Fine | June 30, 1953 |
| 2,659,671 | Von Fraunhofer et al. | Nov. 17, 1953 |
| 2,793,118 | Sanders et al. | May 21, 1957 |

FOREIGN PATENTS

| | | |
|---|---|---|
| 626,979 | Great Britain | July 25, 1949 |

OTHER REFERENCES

Evans et al.: "Principles of Color Photography," N.Y., Wiley & Sons, Inc., 1953. (Copy in Div. 60.) (Page 517 relied on by the Examiner as an authority.) (Pages 191–194, chap. IV, particularly pages 241–249 and chap. XI, also pages 470–472, page 406 et sub., 419 et sub. and pages 96–108 relied on by applicants in the brief.)

Mees: "The Theory of the Photographic Process," the MacMillan Co., N.Y., 1942. (Copy in Div. 60.)

Mees: "The Theory of the Photographic Process," revised edition, the MacMillan Co., N.Y., 1954. (Chapters 5, 22 and 25 relied on.)

Evans: "An Introduction to Color," John Wiley & Sons Inc., 1948. (Copy in S.L.)

Glafkides: "Chimie Photographique," Paul Montel, Paris, 1949. (Copy in Library of Congress.)

Friedman: "History of Color Photography," the American Photographic Pub. Co., Boston, 1944. (Copy in Div. 60.)

Handbuch der Wissenschaftlichen und Angewandten Photographie, vol. IV (1930) and vol. VI (part 1, 1931; part 2, 1933). (Copies in the Library of Congress.)